Oct. 13, 1959  H. R. FRANKLE ET AL  2,908,825
PHOTOELECTRIC COUNTER
Filed Dec. 10, 1956  3 Sheets-Sheet 1

INVENTORS
DONALD W. WATSON
HARRY R. FRANKLE
BY
Kenway, Jenney, Witter, & Hildreth
Attys.

INVENTORS
DONALD W. WATSON
BY HARRY R. FRANKLE

United States Patent Office 2,908,825
Patented Oct. 13, 1959

2,908,825

PHOTOELECTRIC COUNTER

Harry R. Frankle and Donald W. Watson, Des Moines, Iowa, assignors to Midwest Automatic Control Co., Des Moines, Iowa Application December 10, 1956, Serial No. 627,489

2 Claims. (Cl. 250—214)

This invention relates in general to counting devices and in particular, to photoelectric counting apparatus.

In practically every industrial operation it is necessary that the rate of production of the articles being manufactured be measured. Many different mechanical counters have been devised for the various needs which have arisen. In more recent years, in applications where the counting rate is extremely fast or when the counting operation must be continued for long periods of time, mechanical counters have proven unsatisfactory. Inevitably, accuracy has been lost because of wear in moving parts and breakdown due to fatigue in mechanical members has been encountered. Electromagnetic counters have been devised as a substitute for mechanical counters in high-speed and precise applications. These too have been unsatisfactory because of relay chatter especially at high counting speeds, or from deterioration of contacts due to arcing and oxidation.

The most trouble-free systems presently known for counting with great accuracy at high speed have utilized photoelectric counters. Photoelectric counters that have been developed have fallen generally into one of two categories. Where the articles to be counted are actually separated one from another, they may be passed before a photocell to periodically interrupt a beam of light directed at the photocell. In this manner, maximum contrast in photocell illumination is obtained, inasmuch as each article blocks all incident light from the beam which is illuminating the photocell for a period depending on the size and speed of passage of the article. In those situations where the articles to be counted are not physically separated, it is usually desirable or necessary to use the objects to be counted as reflectors. Some physical difference as, for example, the geometric disposition of the articles to be counted can be used to vary the reflective qualities of each article and thus modulate the light reflected by the articles to a photocell.

One field in which there exists a great need for a photoelectric counter is in the counting of newspaper production. It is quite customary at present to use mechanical registers which are geared to the newspaper presses. Apart from the usual mechanical difficulties posed by such devices, there is the further problem that only a "gross" production count results. The "net" count can be made in newspaper production only after adjustment for waste has been made. Such waste consists in the papers removed at the press delivery point by the pressmen because of poor quality or for other and various reasons. The "net" count is actually the count of the papers as they are delivered to the distribution point.

Another factor dictating the use of photoelectric rather than mechanical or electromagnetic counting for precise results is that the variation in speed of passage of the papers at the counting point is considerable. For example, when the presses are running at high speeds, the papers could conceivably be passing the counter at a rate of 700–800 per minute. On the other hand, when the paper in the presses breaks, it is necessary that the machines be rethreaded. While such rethreading is taking place, the press is inched along for a period of time. Thus, a counting device to have real value in this application, would necessarily have to be capable of counting from very low to very high rates of speed.

Such photoelectric systems as have been suggested have suffered from one or another of several persistent problems. For example, there has not been a simple inexpensive electronic switch to convert the output of the photocell into useful signals where the counting rate is variable over wide ranges as it is in newspaper counting. In addition, there has not been an electronic switch and circuit which are properly responsive to output from the photoelectric transducer and non-responsive to noise signals where a low signal-to-noise ratio is experienced. This is a glaring fault, inasmuch as triggering by noise signals results in the registering of counts in excess of the true value. Actually, such photoelectric devices as have been developed do not have a sufficiently high signal-to-noise ratio to permit keeping the sensitivity of the photoconductive device at a point where the varying reflective quality of the surface reflecting the light is ineffective to produce a count except at the point of a maximum illumination of the scanning cell.

In general, the present invention consists in a system for high speed photoelectric counting in which light is modulated by being reflected from the surfaces of articles to be counted. A circuit containing relatively few and inexpensive electronic components is provided for converting light which has been modulated by varying reflection into pulses which can be counted by well-known and conventional pulse counters. The circuit includes a glow tube which is made to conduct current as each article passes by the varying resistance of a photoelectric cell which is placed in series-parallel relationship with the glow tube. A pulse of current is developed each time the glow tube fires. An output coupling network which includes a differentiator-clipper provides output pulses capable of being recorded by an electronic pulse counter. The operation of the circuit is such that counting rates from those approaching zero to an upper limit fixed only by the characteristics of the photoconductive device may be handled. For a better understanding of the present invention, together with other objects, features and advantages, reference should be made to the following detailed description of a preferred embodiment of my invention. This embodiment has been selected for purposes of illustration only, and is shown in the accompanying drawings in which:

Figure 1:
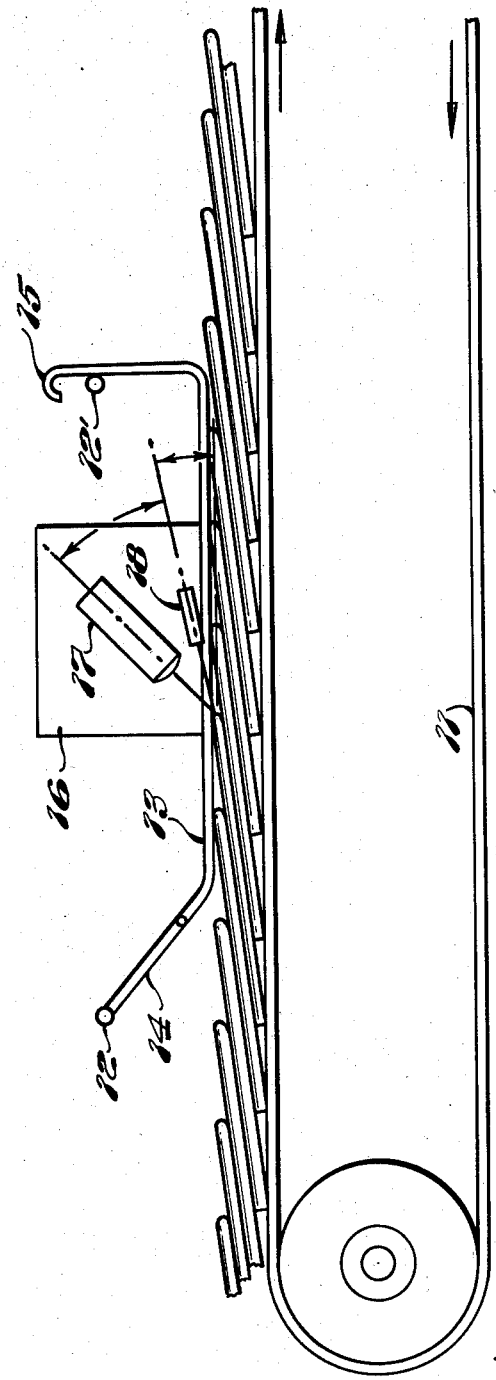
Fig. 1 is a schematic side view of a newspaper track and the counting apparatus.

In Fig. 1 a counting station and a conveyor 11, which may be considered to be running from the newspaper press delivery point to the distributing or mailing operation, are shown. Any waste copies of the newspapers have been removed by press men before the counting station is reached. Two fixed pins 12 and 12' are disposed in spaced relationship on a line above and parallel to the conveyor. A shoe having a sole plate 13, a hinged end 14 and a limiting hanger 15 may be used to support the photoconductor counter enclosure 16, although the use of such support is merely convenient rather than essential. The hinged end 14 of the shoe is pivoted about support pin 12 and the sole 13 of the shoe is designed to rest substantially parallel to the conveyor upon papers being carried along the conveyor. The hook end 15 limits the drop of the shoe when the conveyor is empty. The pivot and hinge arrangement permits the shoe to rise to any reasonable height necessitated by the thickness of the papers being counted with the sole plate 13 remaining substantially parallel to the conveyor bed.

Within the photoconductor enclosure is a light source 17 and a photoconductor 18. The light beam from light source 17 is directed through a slot in the base of the leading end of the shoe at an angle which may be approximately 45° to the conveyor bed. Light is reflected from the fold of the newspaper to the photo conductor 18 which is aimed at an angle of about 15° to the conveyor bed. The enclosure 16 prevents ambient light from having any effect upon the photoconductor.

Figure 2:
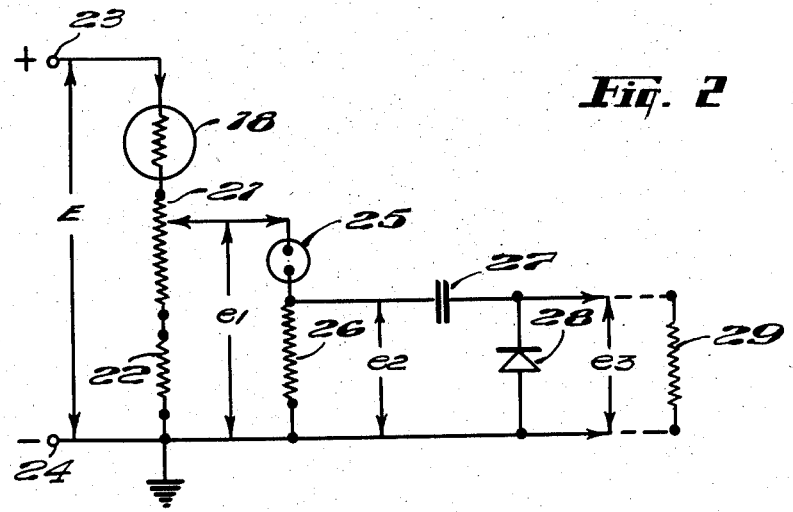
Fig. 2 is a diagram of the counting circuit.

In Fig. 2 there is shown the preferred circuit for use with the photoconductor to produce the output count. In the circuit, the photoconductor 18 is connected in series with a potentiometer 21 and fixed resistance 22 across the input supply voltage designated as "E" between the terminals 23 and 24. The supply voltage E is selected to be equal to approximately twice the mean value between the voltage necessary to fire and the voltage necessary to extinguish the glow in a glow tube 25. It is, of course, a direct current voltage which may be obained from any conventional direct current voltage supply. It has proven convenient to have terminal 24 connected to a reference voltage or grounded as shown. Glow tube 25 is connected between the tap of the potentiometer 21 and the reference side of the voltage supply, terminal 24, through a resistance 26. An output coupling capacitor 27 is connected to the junction of the glow tube 25 and the resistance 26. The other terminal of coupling capacitor 27 is connected to a diode rectifier 28 preferably of the crystal type and also to the ungrounded output terminal. Diode 28 is connected back to the reference voltage terminal 24, and the output appears across its terminals. The output signal may more properly be considered to be developed across the resistance 29 which is actually the input resistance of an electronic counter fed by the circuit. For that reason the connections to resistance 29 are shown in dashed lines.

The operation of the circuit in any photoelectric counting application will be easily understood by referring to Fig. 3 which illustrates the wave forms of the voltage existing in various parts of the circuit of Fig. 2 when the circuit is applied to newspaper counting. The input voltage E is across the series combination of the photoconductor 18, the potentiometer 21 and the fixed resistance 22. If no change in the light incident upon photoconductor 18 occurs, a constant current is drawn through those three elements and no signals are developed.

Figure 3A:
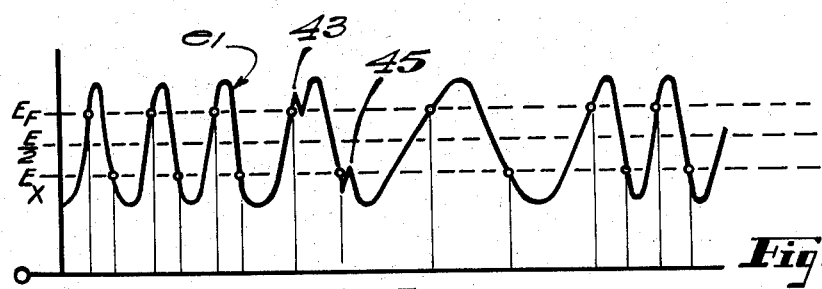
Fig. 3a, 3b and 3c are graphical representations of various wave forms developed in the circuit of Fig. 2.
Figure 4A:
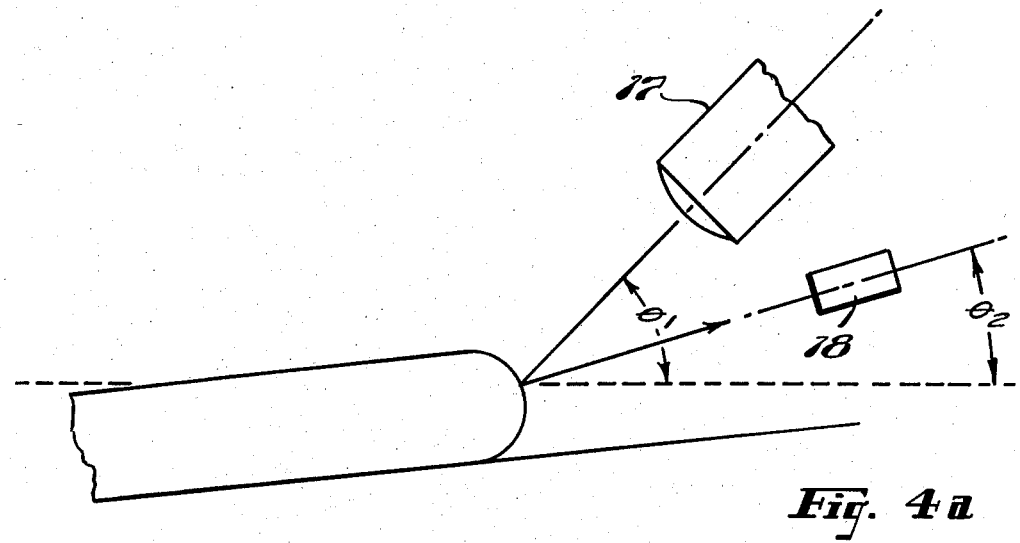
Figs. 4a and 4b are side views of a newspaper track to which the invention has been applied for counting purposes.

Assuming, though, that there is movement of a conveyor and a newspaper passes into the range of the counting station, the counting action begins. As the fold of the newspaper reaches the point of maximum reflection as shown in Fig. 4a, an increase in illumination of photoconductor 18 occurs. With the increase in illumination, the resistance of the photoconductor 18 decreases. The decrease of resistance of photoconductor 18 permits an increase in current through the branch of the circuit which includes photoconductor 18, potentiometer 21 and fixed resistance 22. The voltage developed between the top of potentiometer 21 and terminal 24 is of course, determined by the value of the current flowing through the potentiometer 21 and the fixed resistor 22. This voltage is labeled $e_1$ in Figs. 2 and 3a. The voltage $e_1$ increases with the increase of light on the photoconductor and utimately reaches the voltage $E_f$ at which the glow tube 25 fires.

When the glow tube 25 fires, a current flows from the tap of potentiometer 21 through resistance 26 to terminal 24. The flow of this current develops a voltage across resistance 26 which is labeled $e_2$ and is illustrated in Figs. 2 and 3b. Continued movement of the newspaper under the slot in the shoe causes less light to be reflected and increasing resistance to be exhibited by photoconductor 18. When the resistance of photoconductor 18 reaches a sufficient value at some point prior to the newspaper reaching the position illustrated in Fig. 4b, the current through photoconductor 18, potentiometer 21 and fixed resistor 22 become so low that the voltage $e_1$ developed between the tap of potentiometer 21 and grounded terminal 24 drops below $E_x$ which is the voltage necessary to maintain the glow tube 25 in a conductive state. As is clear in Fig. 3b, the amplitude developed across resistance 26 during the conduction period, varies directly with the instantaneous value of $e_1$ and with the instantaneous ratio of the signal resistance (resistor 26) to the sum of fixed resistance (resistor 26) and the variable resistance of the glow tube.

Figure 3B:
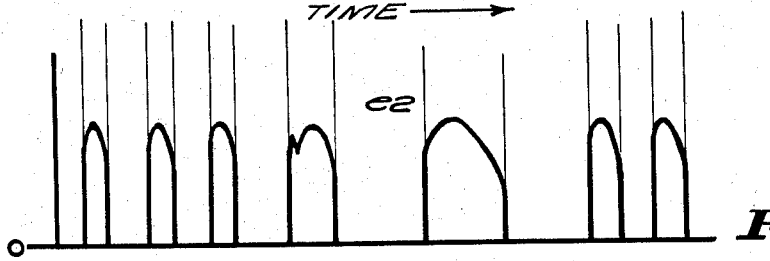
Figure 3C:
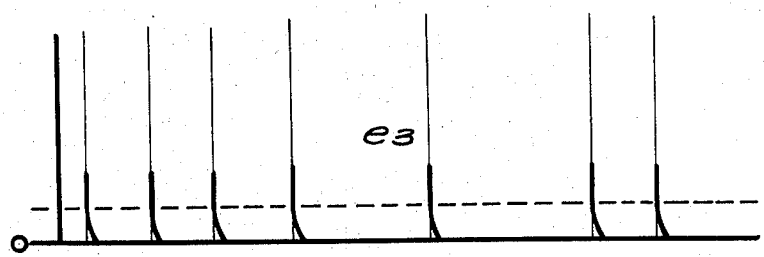

The output which is produced consists of short pulses of voltage $e_3$ shown in Fig. 3c. These pulses are formed in a differentiating and clipping network. The differentiating network is composed of capacitor 27 and the fixed resistance 29 which is actually the input resistance of an electronic pulse counter. The clipping function is performed by the crystal diode rectifier 28 which is oriented in the circuit to ground out any negative output. The output pulses are of substantially equal amplitude and duration despite wide variations in the counting rate. One pulse is produced for each fluctuation of the voltage $e_1$, therefore, one count is produced for each article passing the photocell. The circuit is operative from counting rates approximating zero to an upper limit which is determined by the frequency response characteristics of the photoconductor.

Fig. 3a, in addition to illustrating the voltage $e$, shows the interrelation between the various circuit voltages. The input voltage E is chosen to be approximately twice the mean value between the voltage $E_f$ at which glow tube 25 fires and the voltage $E_x$ at which the glow tube 25 is extinguished. The potentiometer 21 is adjusted to set $e_1$ at the mean value between $E_f$ and $E_x$ when the illumination level is at the average value for the counting operation being performed.

It is desirable that the level of illumination should vary between wide limits. In this manner, the excursions of $e_1$ are caused to be as great as possible assuring alternate firing and extinction of the glow tube. It is also desirable that the difference between $E_f$ and $E_x$ be considerable. The noise pulses 43 and 45 shown in Fig 3a indicate the advantages. If the amplitude of pulse 43 in the negative direction were great enough to drop the voltage level below $E_x$, an extra count would result. Correspondingly, if the excursion of the pulse 45 in the positive direction were sufficient to reach $E_f$ an extra count would result.

Where signal-to-noise ratio is low, it is obvious that the difference between $E_f$ and $E_x$ should be kept as large as possible, by proper selection of resistor 26. $E_f$ is fixed for the glow tube in the circuit, but $E_x$ may be increased or decreased by increasing or decreasing (respectively) the resistance 26 within limits.

Figure 4B:
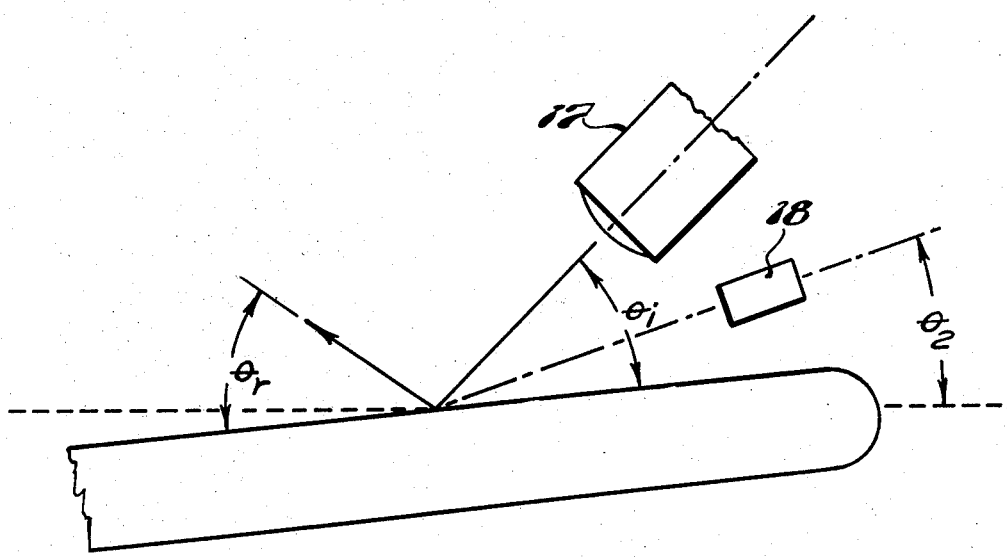

It may be seen in Fig. 1, and even more clearly in Figs. 4a and 4b, that optimum performance is obtained by observing certain geometric relations. The light source 17 is placed as shown with its axis at an angle $\theta_1$ to the horizontal, which is the plane of the conveyor 11. The photoconductor 18 is placed with its axis at an angle $\theta_2$ to the horizontal plane of the conveyor 11. The angles $\theta_1$ and $\theta_2$ are approximately 45° and 15°, respectively. Thus, when a paper is at the point relative to the light source shown in Fig. 4a, maximum reflection takes place, the path of the light beam being along the axes of the light source and the photoconductor, as shown. Under these conditions, illumination of the photoconductor is maximum.

Conversely, when a paper reaches the point relative to the light source shown in Fig. 4b, light incident on the paper at an angle $\theta_i$ is reflected away at an angle $\theta_r$ to the newspaper. Under these circumstances, illumination of the photoconductor is at a minimum. The direction of movement of the newspaper, either to the left or to the right obviously does not affect the operability of the counter; the same maxima and minima would still be produced.

It is noteworthy that the conditions of maxima and minima can be set up for objects of any reasonable size. It is usually desirable that the axis of the photoconductor be roughly parallel with the surface of the objects being counted. With such geometry, great efficiency is possible because of the resulting reduction in signal-to-noise ratio. However, many of the advantages of the present invention are attainable by locating the photoconductor 18 with its axis lying along the line formed by the reflected beam (Fig. 4b). In this instance modulation of the beam occurs as the fold of the paper interrupts the light beam rather than as the fold of the paper gives maximum reflection as described and shown hereinabove. In the specific application of newspaper counting, the presence or absence of printed matter on the newspaper surface becomes of no importance or effect in accurate counting, when these geometric considerations are observed.

Although what has been shown and described constitutes a preferred embodiment, numerous modifications within the purview of the present invention will suggest themselves to those skilled in the art. By way of example, it might at some times be desirable to vary the light from maximum to minimum illumination of the photoconductor by interposing a shutter or reflector between the light source and the photoconductor. The interposed member could be physically moved by each item to be counted to provide the needed modulation. Many other alternatives and modifications are similarly possible and, for that reason, the invention should be limited only by the spirit and scope of the appended claims.

What is claimed is:
1. In a photoelectric apparatus for counting objects a circuit for producing electrical pulses to be counted comprising a photoconductor the resistance of which varies with the level of light incident thereon, means for varying the light incident on said photoconductor once for each article to be counted, a source of direct voltage, a glow tube and a signal resistor in series circuit relationship with said photoconductor and said source, a variable resistance in series circuit relationship with said source of direct voltage and said photoconductor and in parallel circuit relationship with said signal resistor, said glow tube becoming conductive upon the resistance of said photoconductor reaching a first predetermined value, and becoming non-conductive upon the resistance of said photoconductor reaching a second predetermined value, a signal voltage pulse being developed across said signal resistor during each conduction period of said glow tube, an output coupling capacitor and an output resistor in parallel circuit relationship with said signal resistor, and a diode in parallel with said output resistor, whereby said signal voltage pulses are differentiated and clipped to provide ultimate output pulses of substantially equal amplitude and duration.

2. Photoelectric apparatus for counting objects comprising, a source of light, a photoconductor, a plurality of objects each having at least two surfaces, one of said surfaces being disposed at a first angle to a beam of light emanating from said light source, and being disposed in a plane parallel to the path of illumination of said photoconductor, the other of said surfaces being disposed at a second angle to said beam of light and having at least a portion thereof substantially normal to said path of illumination, means for moving said objects whereby said photoconductor is illuminated as each object passes thereby, a circuit for producing an electrical pulse to be counted as each object passes said photoconductor, means for varying the light incident on said photoconductor once for each article to be counted, a source of direct voltage, a glow tube and a signal resistor in series circuit relationship with said photoconductor and said source, said glow tube becoming conductive upon application thereto of a first predetermined voltage and becoming non-conductive upon applied voltage reaching a second predetermined value, the mean value of said first and second predetermined values being approximately half that of said direct voltage from said source, a signal voltage being developed across said signal resistor during each conduction period of said glow tube, and means for providing an output pulse in response to each signal voltage developed.

References Cited in the file of this patent

UNITED STATES PATENTS

| | | |
|---|---|---|
| 2,203,882 | Shore | June 11, 1940 |
| 2,432,084 | Blair | Dec. 9, 1947 |
| 2,466,634 | Breen | Apr. 5, 1949 |
| 2,570,442 | Grosdoff | Oct. 9, 1951 |
| 2,617,593 | Audier et al. | Nov. 11, 1952 |